Figure 2:
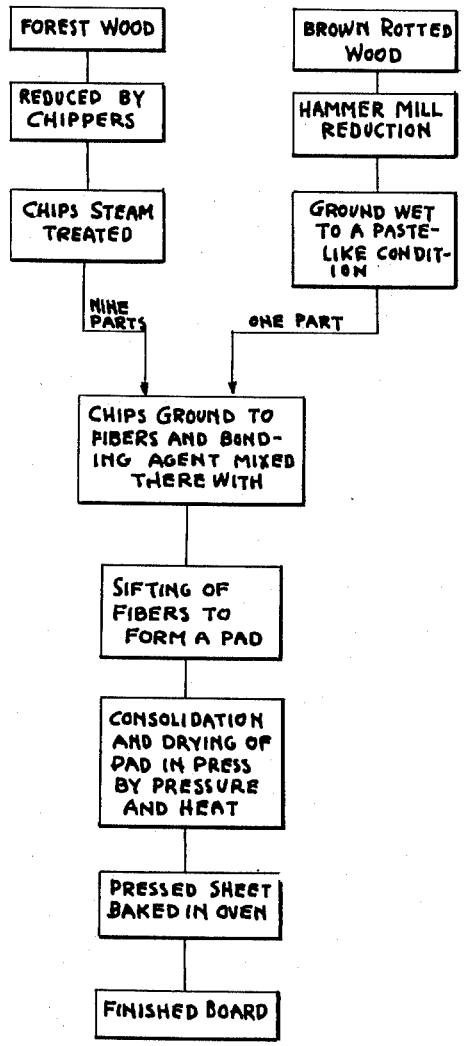

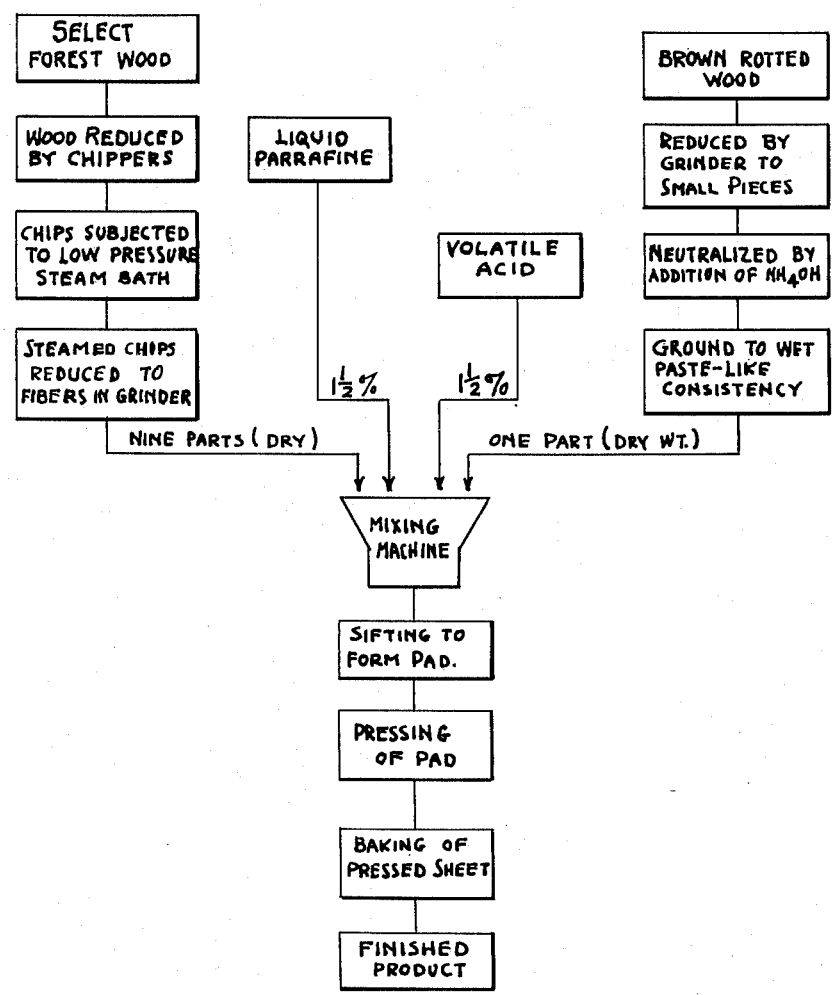
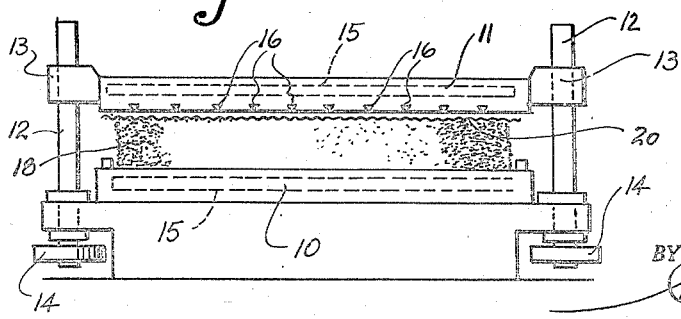

Jan. 8, 1952     W. C. GOSS     2,581,652
METHOD OF MANUFACTURING SHEET WOOD
Filed Jan. 19, 1948     2 SHEETS—SHEET 2

INVENTOR.
WORTH G. GOSS
BY
Cook & Robinson
ATTORNEYS

Patented Jan. 8, 1952

2,581,652

UNITED STATES PATENT OFFICE 2,581,652

METHOD OF MANUFACTURING SHEET WOOD

Worth C. Goss, Seattle, Wash., assignor to United States Sheetwood Company, Seattle, Wash., a corporation of Delaware Application January 19, 1948, Serial No. 3,000

11 Claims. (Cl. 18—47.5)

This invention relates to the manufacture of pressed lumber products which I will hereinafter refer to as "sheet lumber" and which are of the general character of those known in trade and industry by such names as "fiber boards," "sheet wood" and "pressed wood," and are composed entirely, or in predominating part, of raw ligno-cellulosic fibers with which there has been admixed a special bonding agent, the mixture formed into a matted layer, or pad, and then consolidated and the fibers welded together under the action of heat and pressure to produce hard, integral sheets of material suitable for use as lumber.

The present application is a continuation in part of my co-pending applications filed, respectively, under Serial No. 637,107, on December 22, 1945, now U. S. Patent No. 2,485,587 and Serial No. 713,393, on November 30, 1946 now Patent No. 2,545,459.

More specifically stated, the present invention has to do with improvements in methods of manufacturing sheet lumber products of the character of those above mentioned, and also as disclosed in other of my co-pending applications, filed under Serial Numbers 680,838, now abandoned and 697,365, now abandoned in each of which applications I have described the making of sheet lumber products from an admixture of ligno-cellulosic fibers and a hydro-plastic bonding agent, consolidated under the action of heat and pressure.

It is the principal object of this invention to provide a practical method for the manufacture of sheet lumber products of the character of those above mentioned and as described in my various co-pending applications. Furthermore, to provide a method of manufacture that will result in products of greater utility and of greater strength than heretofore obtained and also having greatly increased resistance to the absorption of water.

Another object of my invention is to provide a method for the manufacture of products of the above kind, suitable for use as lumber and which, in the consolidating or pressing of the mixture of wood fibers and bonding agent, will set up very hard and in a comparatively short time, even in the presence of a considerable percentage of water and at a relatively low pressing temperature.

In addition to what I have disclosed in my earlier applications, above listed, I will here mention my discovery that if any one of certain volatile acid substances, for example, acetic acid, propionic acid, or formic acid, is added in predetermined definite amount to the unconsolidated mixture of ligno-cellulosic fibers and my hydro-plastic bonding agent, either as previously prepared or as hereinafter described, some very desirable results will be attained in the finished product. For example, the pressed sheets will have substantially greater resistance to absorption of water, greater strength, more hardness, and will set more quickly in the press and at a comparatively low temperature. The very desirable result of increased strength, by reason of the addition of the acid, is noted even in products made of the fibrous mixture, omitting the hydro-plastic bonding agent. However, without use of the designated bonding agent, the water resistance of the product will not be noticeably changed by the addition of the acid, and it is generally the case that water resistance, along with strength, is most desirable.

It will be mentioned here, that I have demonstrated that when certain non-volatile acids are added to the wood fibers, greater resistance to water absorption will result, but non-volatile acids, generally, are detrimental to the strength of the product due to the fact that they sear or burn the wood fibers, particularly under the action of the baking heat which is applied to cure or finish the product. An exception to this general rule is carbolic acid where the baking heat causes the acid to chemically react with the lignin of the fibers or with the plastic.

In my earlier application, I taught the making of a board from a mixture that is prepared as follows: First, raw wood chips are subjected to a bath in boiling water or an equivalent exhaust steam treatment to soften the wood. Then the warmed chips are passed through a fiberizing machine or inter-plane grinder and reduced thereby to fine, long fibers. With the fibers there is then mixed a designated amount of a special hydro-plastic bonding agent that comprises brown rotted wood ground or reduced to a semi-colloidal or paste-like consistency. Preferably the mixing of the bonding agent with the fibers is accomplished by passing the fibers and bonding agent simultaneously through the grinder. However, the mixing can be well accomplished by passing the agent through the grinder with the chips. The preferred mixture comprises about nine parts fiber and one part bonding agent, based on the dry weights of the materials. Used in these proportions, there is no excess of plastic yet each individual fiber will be coated.

The fibers, so treated with the plastic bonding agent, are then sifted through one or more screens of about ¾" mesh, onto a flat plate or base, to form a pad or layer in which the fibers are promiscuously interlaced. The pad is then consolidated in a hot platen press and the fibers welded together under the action of heat of about 350° F. and pressure of at least 50 pounds per square inch. In this pressing operation, the bonding agent reacts with the wood fibers under the effect of heat applied, polymerization takes place in the plastic and a quick, permanent solidifying of the product results.

Figure 3:
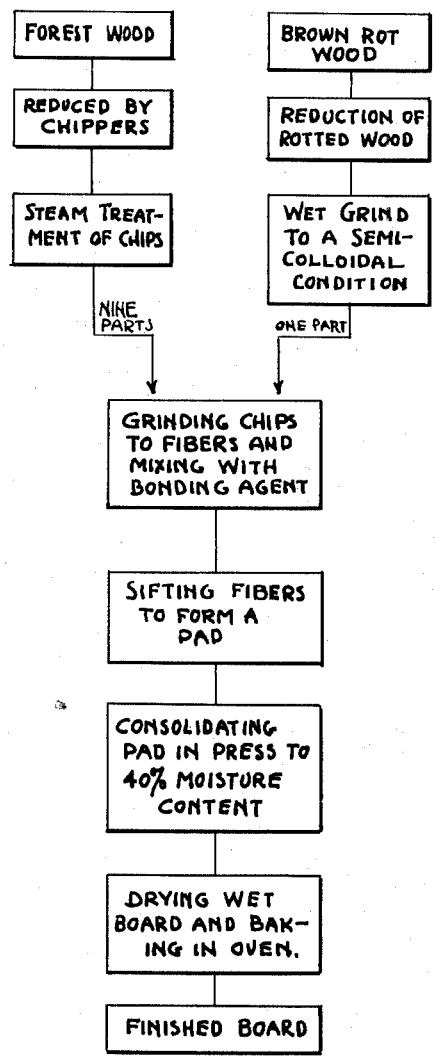

Sheet lumber products of the present invention may be made according to the above method and also in accordance with various modifications of the present preferred method. For better understanding, I have, in the accompanying drawings, illustrated flow diagrams of various methods. In the drawing, Figs. 1, 2 and 3, respectively, are flow diagrams of methods hereinafter set forth as Example I, Example II, and Example III. Fig. 4 is a vertical section of a press of a type suitable for the manufacture of the present sheet lumber.

In the present preferred method of making a board or sheet of lumber of the character of those above referred to, and having all those previously mentioned desirable characteristics and advantages of strength, water resistance and hardness to the maximum degree, I proceed according to the flow diagram of Fig. 1, which is as follows:

Example I

Ligno-cellulosic fibers are produced from forest wood, preferably from green chips derived from wet logs. Douglas fir is a wood that is quite satisfactory and now readily available in the Pacific Northwest for the present purpose, but many other woods such as cedar, ponderosa pine and spruce, treated in like manner as Douglas fir, will also serve the purpose quite well and for some products might be found more desirable.

The wood chips are first subjected for about fifteen minutes to a bath of low pressure exhaust steam, primarily in order to heat and somewhat soften them for the subsequent fiberizing operation. Then, while hot, and after free water has been drained therefrom and with only their naturally contained moisture, the chips are reduced to fibers. Preferably this reduction is accomplished by passing the chips through an attrition mill comprising relatively rotating grinding disks between which the chips pass and which operate to fiberize the wood rather than to cut or comminute it. Usually the above mentioned steam treatment of the chips and the subsequent reduction will provide very fine hair-like and comparatively long fibers that, figured on the basis of the dry weight of wood, contain about 80% moisture.

To materially reduce the necessary pressing period, for consolidation of the board and welding of the fibers, and also to give greater water resistance and additional strength to the finished product, a hydro-plastic bonding agent, similar to or like that disclosed in my earlier applications, is mixed with the fibers prior to the formation of the pad and its consolidation. The bonding agent which I use, and which I designate as a thermo-setting, hydro-plastic bonding agent, due to its property of setting while hot and wet, makes possible the safe removal of the consolidated sheet from the press even while still venting steam from its pores. The bonding agent as now used is prepared as follows:

Brown rotted wood, such as derived from Douglas fir and which may be the residue left in the forests as a result of the action of certain fungi on wood, especially on fallen tree trunks that are lying on the forest floor, is ground or reduced by means of a hammer mill or other type of mill suitable for the purpose, until it resembles coarsely ground coffee. Brown rotted wood derived from cypress, oak or Western red cedar is also satisfactory for this purpose. The type of fungi which produce substances suitable for the manufacture of this glue therefrom is of the general classification which produces what is known as "brown rot" in wood rather than "white rot." This material, left on the forest floor, as the end product of the decomposition of wood under influence of moisture, the various fungi and long-time aging, is brown in color and when dry is of very low density, that is, approximately .15 specific gravity.

It may be explained further that the family of brown rot producing fungi quantitatively feed on the cellulose and non-lignin content of wood until only the lignin portion is left. This residue is somewhat chemically changed from the original lignin after complete action of the fungi in that the oxygen content is higher than that of natural lignin. White rot fungi, on the other hand, feed on the lignin constituent of wood and thus render it valueless for the purpose of preparing glue.

Should the "brown rot" material as produced by nature not be available, then a substantially cellulose-free residue can be artificially produced. To accomplish this, I preferably select a wood which in its natural state contains a certain percentage of wood acids that is most effective for the incubation of the cellulose-consuming fungi therein. If, however, the wood that is available or selected for use does not contain any or the proper percentage of acid, then its acid content is adjusted substantially to the equivalent of from one to five percent of acetic acid on the basis of the dry weights of the wood. In the use of the word "adjusted," I mean in general that if one percent of acetic acid when added to the wood gives the desired acidity for the present purpose, then approximately 6% of tannic acid could be used to give the same result, by reason of the fact that the tannic acid molecule is about six times as heavy as the acetic acid molecule. Other acids that may be used to effect this adjustment are rosin acids and gallic acid. The wood that I have employed with most satisfactory results in the making of my glue, and which, by reason of its containing in its natural state a percentage of natural wood acids that is most satisfactory for the production of cellulose-consuming fungi, needs no adjustment in its acidity, is Douglas fir.

Preparatory to its treatment, the wood that is selected for use is reduced to the form of small pieces, chips or to sawdust, and after its acidity has been tested and adjusted if necessary, a cellulose-consuming fungi, preferably the specific fungus *Polyporus schweinitzii*, is thoroughly mixed therewith. As a practical and economical means of effecting this mixing and distribution, I pass the wood in the form of sawdust, chips or pieces, and a fungi-bearing material, simultaneously through a wood grinder of a character whereby both may be reduced to fine condition and thoroughly and evenly mixed.

The ground mixture of wood and fungi-containing material is then maintained under those conditions of temperature, moisture and air that are most favorable for the multiplication and growth of the micro-organisms that constitute the cellulose-consuming fungi. The mixture should comprise a considerable proportion of water at a temperature of less than 90° F. in the presence of the wood acid and warmth that is best for the rapid incubation and growth of the fungi. The incubation of the fungi in the mixture should be continued for a period of such length that the residue is substantially free of cellulose. The residue that is left by the fungi action on the wood over the designated period contains very little of the original cellulose. It is brown in color, soft and friable, and by acid analysis comprises 70% or more of lignin. However, the lignin residue differs from the natural lignin of the wood in that about 70% of it is soluble in 1% sodium hydroxide solution, this not being the case in the natural lignin. Also the methoxyl content is less than in natural or pulp liquor lignin.

When a very high-grade plastic for use as a water-proofing as well as a bonding agent is desired, the ground brown rot material is washed with dilute ammonium hydroxide at a temperature of about 150° F. until it shows a pH of about 8.0. This refinement of the bonding agent is in accordance with the teachings set out in a copending application filed under Serial No. 780,759 on October 18, 1947, now Patent No. 2,563,836, and is for the purpose of removing therefrom the non-volatile humic acid, which I have found to be detrimental to fiber strength. The black liquid that results from the washing is centrifuged off and the resultant purified material is then ground to a smooth, fluid and paste-like consistency. This purified rotted wood is a derivative of lignin, which is capable of polymerization at low temperatures in the presence of a suitable catalyst such as acetic or oxalic acids. The paste-like substance, derived by wet grinding the brown rotted wood, is the hydro-plastic bonding agent of the present invention, and it is to be understood that the origin of the brown rot, whether by natural processes or artificially produced, is of no importance, since the characteristics and properties of the products produced therefrom are the same.

The smooth, paste-like material designated as the hydro-plastic bonding agent and as derived from the brown rotted wood, either as produced by nature or as produced artificially, is then mixed with the prepared wood fibers preparatory to the formation of a matted layer or pad of the material therefrom.

The mixing of wood fibers and plastic is very satisfactory on the basis of one pound of bonding agent to nine pounds of fiber, based on the dry weights of the materials. These proportions may be varied according to desired variations in, or as required by reason of, the kind of wood used or characteristics to be produced in the pressed articles. However, more than 25% of plastic is not ordinarily advisable because of brittleness and shrinkage on drying.

Mixing of materials is very economically and satisfactorily accomplished by feeding the bonding agent, as above produced, into the grinder coincident with the feeding of the steam treated chips in the production of the fiber or with the fibers in a second passage through the machine. The rate of feeding the materials into the machine would be such that the desired proportions by weight of fibers and bonding agent would be obtained in the finished product. The mixing of the bonding agent with the wood fibers in this way will result in all fibers produced by the attrition mill being effectively and evenly coated with the plastic but with no excess.

It will further be explained that the nine to one proportions of fibers and plastic does not cause fibers to ball up in their delivery from the machine. In fact, the mixture may be sifted with substantially the same ease as if the fibers had not been coated and this is quite desirable in the preparation of the pads of fibers for pressing.

To the mixture of hydro-plastic bonding agent and fibers, it is also desirable, but not absolutely essential, to add from 1% to 1½% by weight of paraffin. Also, and this is of importance in the production of a better product, to add about 1½% of one of the volatile organic acids previously mentioned that, when added to the mixture prior to consolidation, results in substantially greater resistance to absorption of water, greater strength and hardness and faster setting of the board in the press. Acetic acid is most desirable in my present operations. The plastic coated wood fibers, volatile acid and paraffin is then thoroughly mixed. This mixing can best be accomplished by passing them simultaneously through the grinding or fiberizing mill, whereby a finer reduction of fibers is obtained, as well as an even distribution of acid and paraffin over the fibers.

The treated and coated wood fibers are then sifted through a series of suitable screens of about ½-inch to ¾-inch mesh, onto a flat, smooth metal base plate, to form a loosely matted pad or layer of promiscuously interlaced fibers. This pad is formed to the necessary depth for producing the desired thickness of the consolidated sheet. For a sheet of approximately ⅝ inch final thickness, the pad should have a depth of from ten to twenty-four inches, depending upon the density desired. The pad, as formed upon the smooth metal base, is then placed in a heated platen press and is consolidated by the action of heat and pressure to form a hard, rigid sheet of lumber. A press of the type used in plywood manufacture may be employed, or a press like that which has been herein illustrated in Fig. 4 is quite satisfactory for the purpose.

In Fig. 4, 10 designates the lower platen of the press, 11 designates the upper platen, and 12 designates threaded screws that are rotatably fixed to the lower platen and are threaded through lugs 13 extended from the upper platen. The screws are equipped with gear wheels 14 whereby they may be rotated for platen adjustment.

It is to be understood that the platens may be heated by any suitable means, for example by steam, or by electrical units contained therein, and herein designated by reference numeral 15.

For the venting of steam from the pad while being consolidated, the upper platen is formed with a plurality of cross channels 16 that are open at their ends and also open to the under surface of the platen.

In Fig. 4, a pad of the mixture to be consolidated is designated at 18 and directly overlying this is a wire mesh screen 20 which permits escapement of steam from the pad to the channels 16 of the platen.

In the heat consolidating operation by means of a platen press, as above described, a platen temperature of 350° F. to 550° F. is employed and a pressure of not less than about fifty pounds per square inch. During the consolidating process, steam is vented from the pad through the screen and steam escape slots in the upper platen.

In making a sheet or board from a fibrous mixture including the above mentioned hydro-plastic bonding agent, which is a thermo-setting glue, and the volatile acid, the solidified pad may be safely removed from the press while still hot and containing up to 40% of moisture and with steam still venting from its pores. When the hydro-plastic bonding agent is not used, pressing time will necessarily be longer, in order to accomplish the necessary welding of fibers to insure safe removal of the sheet, as is quite well understood. The removal of the pressed sheet while steam is still venting therefrom is possible even without the use of the acid in the mixture. However, the addition of acid facilitates quick removal of the sheet from the press and increases the water resistance of the finished article.

The hot, wet sheets, upon removal from the press, are then passed into an oven and baked in a temperature of about 360° F. until cured. This requires baking about one hour after the board is bone dry. During this baking operation, all remaining volatile acid will be dissipated from the sheet and before any detrimental effect on the wood fibers has resulted therefrom.

It is to be understood that in specifying a pressing temperature of 350° F. to 550° F. and a pressure of not less than fifty pounds per square inch, I have merely given what at present appears to be the most practical both from the standpoint of manufacturing expediency and desirability of the product. However, it is not to be implied that this stated range of temperatures and stated pressure is critical and cannot be deviated from. In fact, boards of a like character can be produced at lower temperatures if a longer pressing period is used, and likewise, can be produced at higher temperatures in a shorter period, so long as the temperature is not so high as to cause burning or charring. For this reason, I do not intend to confine my method to any specific temperatures, pressing intervals or pressures so long as these conditions are not inconsistent with the objects to be accomplished.

In the description above given in connection with Example I, I have stated that the consolidated board is to be removed from the press when its moisture content has been reduced to about 40% and the board then baked at 360° F. until cured. This "curing" has reference to the water resistant quality of the product. When it is fully cured, it has reached its maximum resistance to water absorption. In the method of my earliest application above mentioned, this final baking was accomplished in the consolidating press with the same effectiveness as by the baking operation of Example I, but this tied up the use of the press for an extended period of time which the use of the baking oven has overcome.

The baking period, when accomplished in the press by retaining the sheet under heat and pressure for an extended period, can be shortened or extended by increasing or decreasing the temperature of press platens. Likewise, baking in an oven can be speeded up or extended in like manner. It is to be understood therefore that the temperatures gives are those now thought to be most practical.

It is further to be explained that while I have stated a preference for the use of acetic acid, in a certain amount, that is, 1½%, it is to be understood that any one of the volatile organic acids may be used to obtain like results, the percent used being in proportion to the molecular weight of the acid used as compared with the molecular weight of acetic acid. Therefore, in specifying 1½% acetic acid, it is also to be understood that formic acid, propionic acid could be used with similar results.

To impart a better understanding of the water resistant character of the product produced from the mixture as above described, containing wood fibers, hydro-plastic, paraffin and the volatile acid, it will be here mentioned that a piece of board one inch wide and six inches long cut from the cool, dry board, when immersed in water for a period of 24 hours, will not absorb more than 9% by weight of water, and edge swelling will not increase beyond 7%, whereas if the same composition of materials is used in making a board but without the presence of the mentioned acid therein, a like sample would show water absorption of about 20% as compared with 9%, and an edge swelling of about 10% as compared with 7%. Along with increased resistance to water absorption, the product also shows an increased strength of from 10% to 15% due to the addition of the acid.

By the addition of the designated volatile acid, the actual structure of the board is so changed than hygroscopicity is greatly reduced. The added acid in the mixture acts as a catalyst that causes the hydro-plastic bonding agent to set hard and much more quickly than would be the case if the acid had not been used. In fact, the remarkable and very desirable effect is obtained at a sheet temperature that need not be above 212° F. even in the presence of water.

In certain cases a non-volatile acid such as carbolic acid may be used to improve water resistance of the board. This is because of the fact that at low temperature the carbolic acid acts as a free acid to catalyze the setting of the hydro-plasic bonding agent, but at an elevated temperature of 300° F. the carbolic acid reacts chemically with the hydro-plastic agent and actually ceases to exhibit the burning action of a free acid at 350° F. In this case, which is an exception to the general run of non-volatile acids, the acid is removed by chemical reaction rather than by volatilization.

Where water resistance in the product or speed of setting of material in the press is not of much or any importance, it is practical for its manufacture to use the same mixture of fibers and volatile acid, and to omit therefrom the hydro-plastic bonding agent. Experience and tests have definitely proven that the added volatile acid alone will result in an increase of strength to as much as 25%. However, on account of manufacturing expediency alone, it would be desirable to include the quick setting bonding agent, which greatly improves the water resistance of the product.

To make a board or sheet product of quite satisfactory character as has been described in my application filed on December 22, 1945, under Serial No. 637;107, now Patent No. 2,485,587, I proceed as follows:

*Example II*

Wood chips are prepared from forest wood and steam treated, as in Example I, preparatory to being passed to a fiberizing machine. Also, the hydro-plastic bonding agent, as derived from brown rotted wood, naturally or artificially produced, is reduced in a hammer mill and wet ground to paste-like consistency as in Example I.

The hot chips and bonding agent are then fed through the fiberizing grinder in the heretofore designated proportionate amounts of 9 to 1, to produce the fibrous material which is characterized by the fact that each fiber is coated with the hydro-plastic, thermo-setting bonding agent.

The plastic coated fibers are then sifted through suitable screens of from ½" to ¾" mesh onto a plate to form a loosely matted pad of the promiscuously interlaced fibers. The pad is then consolidated in a platen press under the action of heat and pressure, using a consolidating pressure of about fifty pounds per square inch and temperatures ranging from 250° F. to 550° F., depending on characteristics desired. The board may be held in the press until dry, or it may be removed while still containing a substantial amount of moisture. In either case it is desirable, but not an absolute requirement, that the board be then passed to an oven and baked until completely cured. This usually required about one hour baking after the board is dry.

In this above example, in which no volatile acid is used, a board of good quality is produced but not as water resistant as that of Example I.

Still another example of a method of manufacture is as follows:

Example III

The preparation of raw wood fibers would be in accordance with Example I or Example II. The preparation of the hydro-plastic bonding agent would be as in Example I or Example II except that acids of the brown rotted wood, after being reduced by the hammer mill, are neutralized by the addition of ammonia ($NH_4OH$). This neutralization eliminates the destructive action of the heavy wood acid on the wood fibers during the baking of the board.

The prepared fibers are then passed with the required amount of plastic through the grinder for mixing, the proportionate amounts being as in Examples I or II. The coated fibers are then sifted to form the pad which is passed to the press and consolidated as before described, using pressures of 50 pounds per square inch and above and temperatures ranging from 250° F. to 550° F. as may be required to produce a board of stated characteristics.

The product of Example II, which is a board made from a mixture consisting of raw wood fibers and the present hydro-plastic, thermosetting bonding agent, is substantially that described in my application of December 22, 1945, Serial No. 637,107, and is a very satisfactory material for general building purposes where extreme water resistance is not required. The mixture includes an unrefined bonding agent that is made merely by the wet grinding of brown rotted wood, and which is mixed with the wood fibers by passing it, together with the wood chips, through the mixing grinder. Example III, however, differs slightly from the method of the earlier application in that it calls for the curing of the pressed sheet in an oven after the sheet has been removed from the press. The product of the earlier application is very satisfactory, although not quite as strong as that of Example II.

The product of Example III is characterized by the fact the consolidated sheet is removed from the press while still containing 40% moisture. This is made possible by the fact that the bonding agent will set while hot and wet, under the action of heat of 250° F. and above. This board is baked to complete curing and to give it maximum strength. The main advantage in this method of Example III over that of Example II resides in the shorter pressing period, and is a manufacturing advantage.

The product of Example I is more water resistant, and stronger than the products of Examples II and III by reason of the addition of the volatile acid to the mixture, and by reason of the neutralizing of the acidity of the bonding agent by the addition of ammonium hydroxide thereto before mixing with the fibers.

It is to be understood that any one of the examples given might be modified to more or less extent and good products would still result. Therefore, the claims which terminate the specification will not all be drawn strictly in accordance with the examples given but will be in accordance with the method as set out in my earlier applications of which this application is a continuation in part, as well as in accordance with methods that would be obvious to one after becoming familiar with the examples above given.

In the claims, "raw wood" will be understood to be wood that has not been cooked or treated in a manner to cause any polymerizing action of the lignin therein and "brown rotted wood" will be that which has decayed under the action of brown rot fungi.

Having thus described my invention, what I claim as new therein and desire to secure by Letters Patent is:

1. A method for the production of sheet lumber comprising producing a semi-colloidal bonding agent by the wet grinding of wood that has decayed to a condition of brown rot, passing wood chips and said bonding agent simultaneously through a wood fiberizing machine to reduce the chips to fibers and to cause the individual fibers to be coated with the bonding agent, laying down the fibers to form a loosely matted pad, then compressing the pad and causing setting of the bonding agent and fibers between the platens of a steam vented press at a temperature of between 250° F. and 550° F. and retaining the pressure until the board has become dry.

2. A method for the production of sheet lumber comprising producing a semi-colloidal bonding agent by the wet grinding of wood that has decayed to a condition of brown rot, simultaneously passing wood chips and bonding agent through a wood fiberizing machine, in the proportion of one part of bonding agent to from seven to ten parts fiber, based on dry weights of materials, to cause fiberizing of the wood and a uniform treatment of the individual fibers with the bonding agent, forming a loosely matted pad of promiscuously interlaced fibers, then compressing the pad and setting and coalescing the bonding agent and fibers in a steam vented press under a platen pressure of approximately fifty pounds per square inch and at a temperature within a range of from 250° F. to 550° F.

3. A method for the production of sheet lumber comprising producing a semi-colloidal bonding agent by the wet grinding of wood that has decayed to a condition of brown rot, producing a homogeneous mixture of moist ligno-cellulosic fibers and said bonding agent, forming a loosely matted pad of the mixture, compressing the pad in a steam vented platen press at a temperature within a range of 250° F. to 550° F., to set the binder to produce a hard, rigid board-like body, removing the body from the press and baking it in an oven at a temperature of about 360° F. until cured.

4. A method of producing sheet lumber comprising fiberizing a ligno-cellulosic material, wet grinding wood that has decayed to a condition of brown rot to a paste-like consistency and neutralizing the acidity of the wet ground material, mixing the neutralized material with the fibers as a fiber bonding agent therefor, forming a pad of the mixture and compressing the pad under heat within a range of 250° F. to 550° F. to coalesce the fibers and set the agent in a permanent, board-like body.

5. The method of making sheet lumber comprising reducing brown rotted wood to fine condition, neutralizing the acidity of the reduced material by addition of a neutralizing agent, grinding the neutralized material to a semi-colloidal plastic, producing a homogeneous mixture of approximately nine parts of raw wood fibers and one part of said plastic, sifting the mixture to form a loosely matted pad, compressing the pad and reacting the mixture in a steam vented platen press at a pressure of about fifty pounds per square inch and at a temperature within a range of 250° F. to 550° F., and baking until dry.

6. A method as recited in claim 4 which includes also the addition of about one and one-half percent of a volatile acid to the mixture.

7. A method for the production of board-like bodies comprising preparing a homogeneous mixture of damp ligno-cellulosic fibers, a paste-like bonding agent derived by the wet grinding of brown rotted wood and a volatile organic acid, forming a pad of the mixture, then consolidating the pad and reacting the constituents thereof in a press under a temperature of from 250° F. to 550° F. to produce a hard, permanently set, board-like body.

8. A method as recited in claim 7 wherein the mixture comprises approximately nine parts fibers, one part bonding agent and 1½% acid, based on dry weights of the materials.

9. A method as recited in claim 7 wherein the mixture comprises approximately nine parts fibers, one part bonding agent and 1½% acid, based on dry weights of the materials, and wherein the product is removed from the press while containing approximately 40% moisture and is then oven baked in a temperature of about 350° F. until maximum resistance to absorption of water has been reached.

10. A method for the production of board-like bodies comprising preparing a homogeneous mixture of damp ligno-cellulosic fibers, a paste-like bonding agent and a volatile organic acid, the bonding agent being prepared by grinding brown rotted wood to fine condition; neutralizing the acidity of the same with a neutralizing agent; wet grinding the neutralized material to a paste-like consistency; laying down the mixture to form a pad in which the fibers are promiscuously interlaced; compressing the pad at a temperature within a range of from 250° F. to 550° F. to form a rigid permanently set body; drying the body and baking it in an oven at a temperature of approximately 350° F. until fully cured.

11. A method as recited in claim 10 wherein the mixture comprises approximately nine parts fiber, one part bonding agent and 1½% acid, and is subjected to compression and heat until it contains about 40% moisture, then is removed and subjected to oven baking as stated.

WORTH C. GOSS.

REFERENCES CITED

The following references are of record in the file of this patent:

UNITED STATES PATENTS

| Number | Name | Date |
| --- | --- | --- |
| 539,928 | Wheeler | May 28, 1895 |
| 726,029 | Classen | Apr. 21, 1903 |
| 1,569,272 | Forster | Jan. 12, 1926 |
| 1,724,393 | Carpenter | Aug. 13, 1929 |
| 2,033,411 | Carson | Mar. 10, 1936 |
| 2,080,077 | Howard et al. | May 11, 1937 |
| 2,402,554 | Irvine et al. | June 25, 1946 |
| 2,485,587 | Goss | Oct. 25, 1949 |

FOREIGN PATENTS

| Number | Country | Date |
| --- | --- | --- |
| 154,574 | Great Britain | Oct. 27, 1920 |
| 119,400 | Australia | Jan. 25, 1945 |